Jan. 20. 1925.
G. A. PAYNE
GANG CULTIVATOR
Filed Oct. 25, 1923
1,523,490
2 Sheets-Sheet 1
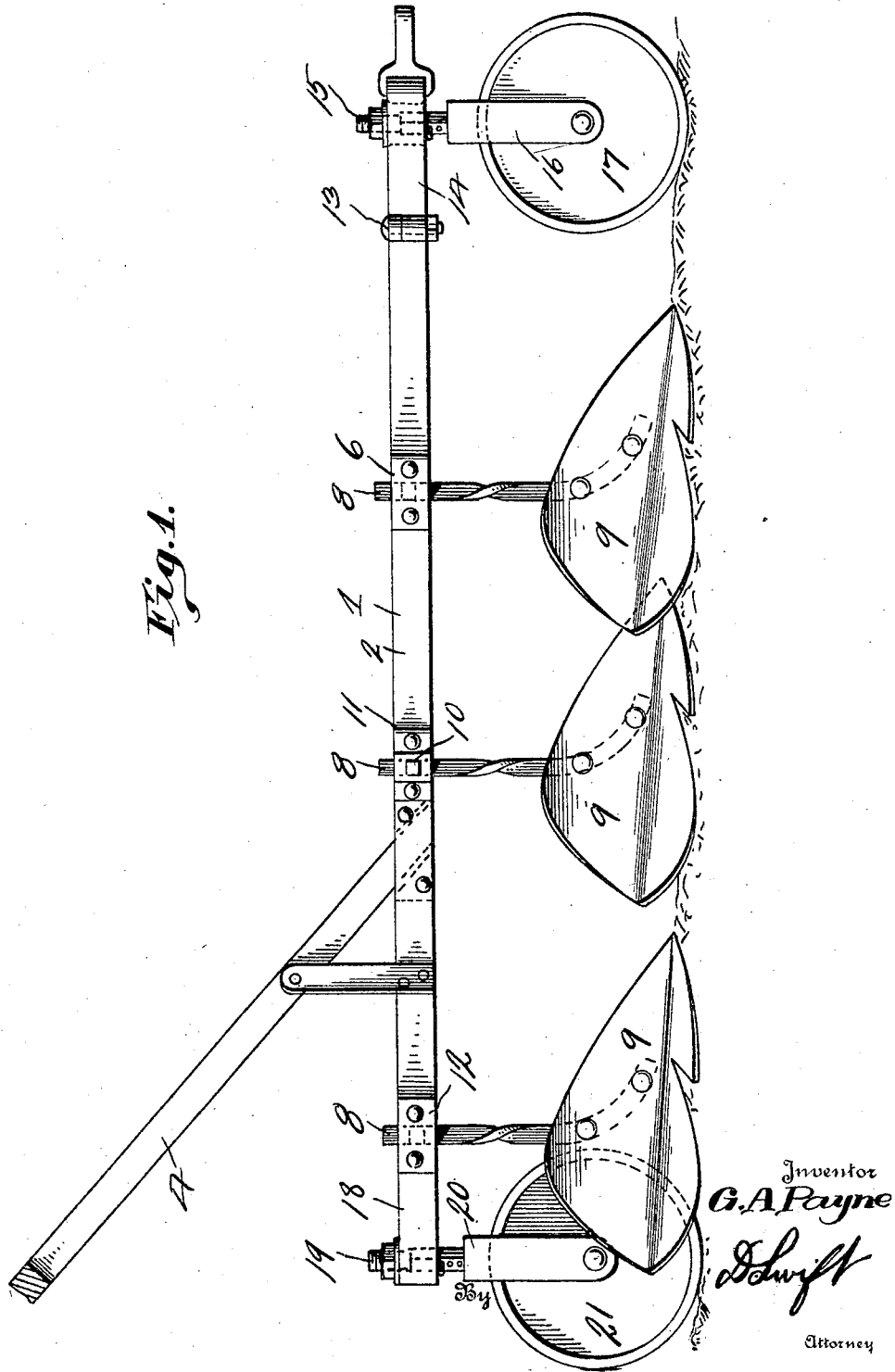

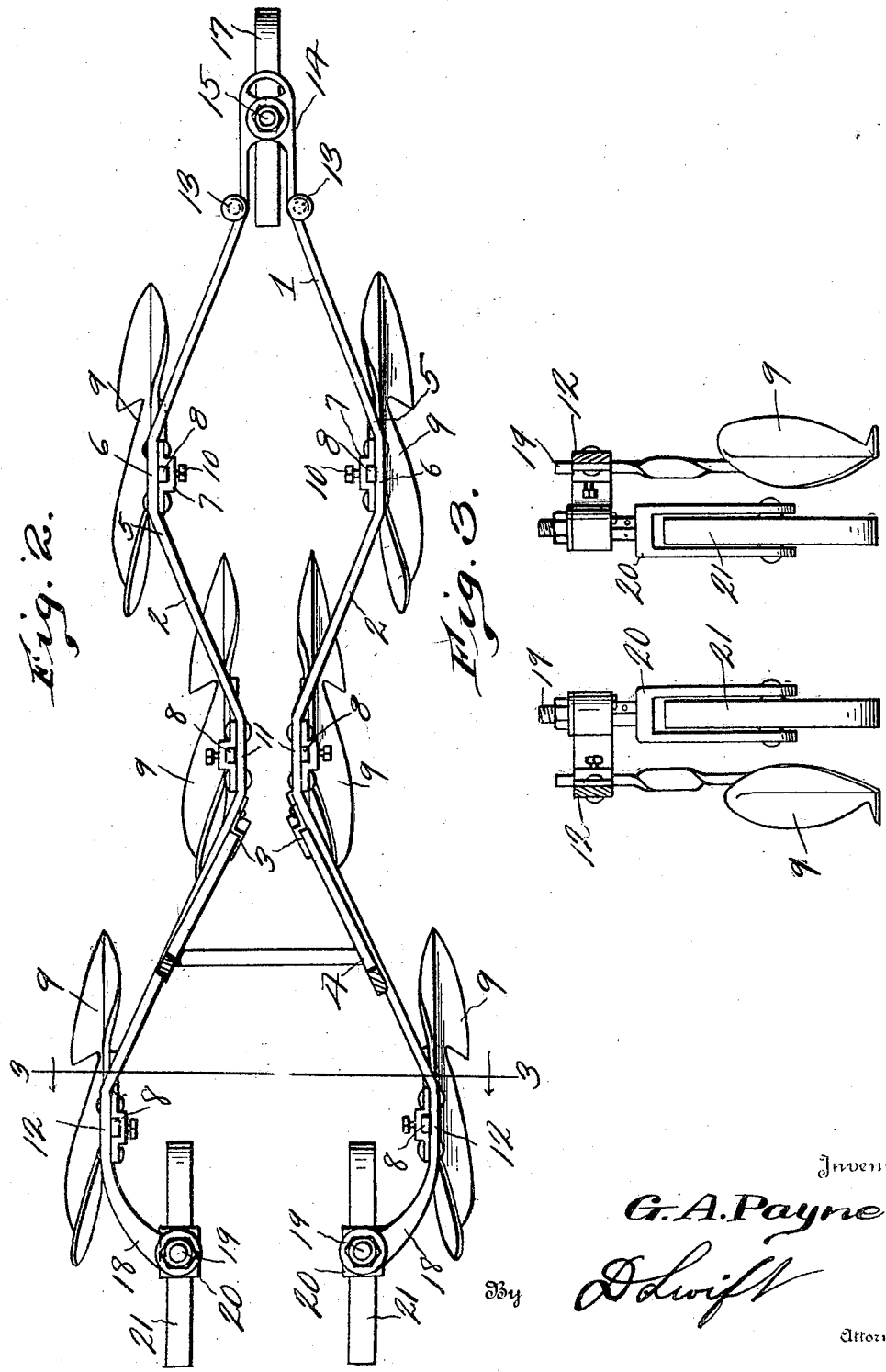

Patented Jan. 20, 1925.

1,523,490

UNITED STATES PATENT OFFICE.

GEORGE A. PAYNE, OF DILLINER, PENNSYLVANIA.

GANG CULTIVATOR.

Application filed October 25, 1923. Serial No. 670,755.

*To all whom it may concern:*

Be it known that I, GEORGE A. PAYNE, a citizen of the United States, residing at Dilliner, in the county of Greene, State of Pennsylvania, have invented a new and useful Gang Cultivator; and I do hereby declare the following to be a full, clear, and exact description of the invention, such as will enable others skilled in the art to which it appertains to make and use the same.

The invention relates to gang cultivators and has for its object to provide a device of this character, whereby a corn field or the like may be easily cultivated and the ground plowing elements constructed in a manner whereby they will not slide over grass, vines or the like as is now the difficulty with a conventional form of cultivator, and at the same time the ground will be plowed and part of the earth turned over towards the plants.

A further object is to provide a gang cultivator having a plurality of plowing elements adapted to plow for a limited distance into the ground and at the same time turn the soil towards adjacent rows of plants.

A further object is to provide adjustable supporting wheels for the cultivator whereby the depth of the plowing operation of the plowing elements may be gaged.

A further object is to provide means whereby the plowing elements may be adjusted vertically for varying the depth of cut thereof and to arrange said plowing elements in staggered relation to each other.

A further object is to provide the frame with compound bends in its opposite sides, in the bottoms of which bends the plowing elements are secured thereby positioning the plowing elements in staggered relation to each other.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the cultivator.

Figure 2 is a top plan view of the cultivator.

Figure 3 is a vertical transverse sectional view through the cultivator.

Referring to the drawing, the numeral 1 designates the horizontal frame of the machine, which frame comprises side bars 2, to which is secured at 3 handle members 4, adapted to be grasped by the operator during a cultivating operation. Bars 2 are provided with outwardly extending V-shaped portions 5 adjacent their forward ends and to the flat portions 6 of which are secured in cleats 7 the vertically disposed posts 8 which carry at their lower ends the cultivator plows 9, said bars being adjustable upwardly and downwardly in the cleats 7 and held in adjusted positions by means of set screws 10, similarly shaped and constructed plows 9 and posts 8 are secured to the flat portions 11 and 12 of the bars 2 substantially centrally thereof, and at the rear ends thereof, however the flat portions 6, 11 and 12 are positioned whereby none of the plows 9 will be in the same longitudinal vertical plane, and consequently during a cultivating operation a relatively wide area is cultivated and the plows will cut through the ground, grass or vines and hill the earth towards rows of plants at opposite sides of the cultivator, thereby obviating the present difficulty experienced with present forms of cultivators where grass is gathered in front of the cultivator shovels or the shovels slide over the grass or vines. It will be seen that not only a cultivating action takes place, but the earth is cut by the plows 9 and hills are thrown towards plant rows at opposite sides of the cultivator.

Pivotally connected at 13 to the forward ends of the bars 2 is a U-shaped member 14, which member has adjustably mounted therein a vertically disposed shaft 15 of a bracket 16, in which is pivotally mounted a supporting wheel 17. It will be seen that by adjusting the shaft 15 in the U-shaped member 14 that the depth of the plowing operation may be varied, however it has been found that a good cultivating operation may be obtained by adjusting the parts so that the plows 9 will only enter the ground about four or five inches, therefore the cultivator can be easily drawn by a horse. Draft animals may be hitched to the U-shaped member 14 in any suitable manner. The rear ends 18 of the bars 2 curve rearwardly and inwardly in a horizontal plane and have vertically adjustable in the ends thereof shafts 19, which shafts are carried by brackets 20 in which are rotatably mounted supporting wheels 21, which wheels may be adjusted in combination with the wheel 17 for regulating the depth of the cultivating operation, however the posts 8 may be also adjusted in combination with the wheels 17 and 21 for adjusting the depth of the cultivating operation.

From the above it will be seen that a cultivator is provided which is positive in its operation, simple in construction and one wherein the cultivator plows will not slide over vines, grass and the like, and earth being cultivated will be hilled or thrown towards rows of plants at opposite sides of the cultivator. It will also be seen that a plowing action of limited depth takes place as distinguished from a dragging action as is now the custom where a cultivator shovel is used.

The invention having been set forth what is claimed as new and useful is:—

A cultivator comprising a horizontally disposed frame, said frame being formed from spaced bars, said bars being provided with oppositely disposed offset and inset portions, plow carrying posts attached to the inset and offset portions of the bars and vertically adjustable, plows carried by the lower ends of said plow carrying posts, the rear ends of said bars curving rearwardly and inwardly, supporting wheels carried by the rear ends of the curved portions of the bars and vertically adjustable therein, said supporting wheels being disposed on the longitudinal center between the plows carried by the spaced bars thereby preventing excessive twisting strain on the bars as the plows move through the ground, a U-shaped member having its arms connected to the forward ends of the bars, a supporting wheel carried by the U-shaped member, said supporting wheel being carried by a shaft vertically adjustable in the U-shaped member and handle members carried by said bars.

In testimony whereof I have signed my name to this specification in the presence of two subscribing witnesses.

GEORGE A. PAYNE.

Witnesses:
H. C. GARRISON,
KARL COX.